(12) United States Patent
Shemer et al.

(10) Patent No.: US 11,516,070 B1
(45) Date of Patent: Nov. 29, 2022

(54) METHOD AND SYSTEM FOR DIAGNOSING AND REMEDIATING SERVICE FAILURES

(71) Applicant: Dell Products L.P., Round Rock, TX (US)

(72) Inventors: Jehuda Shemer, Kfar Saba (IL); Igor Dubrovsky, Beer Sheva (IL); Boris Shpilyuck, Ashdod (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/502,176

(22) Filed: Oct. 15, 2021

(51) Int. Cl.
| | |
|---|---|
| *G06F 15/16* | (2006.01) |
| *H04L 41/0631* | (2022.01) |
| *H04L 41/0654* | (2022.01) |
| *G06N 7/00* | (2006.01) |
| *H04L 41/14* | (2022.01) |
| *H04L 41/12* | (2022.01) |

(52) U.S. Cl.
CPC ......... *H04L 41/0631* (2013.01); *G06N 7/005* (2013.01); *H04L 41/0654* (2013.01); *H04L 41/12* (2013.01); *H04L 41/14* (2013.01)

(58) Field of Classification Search
CPC . H04L 41/0631; H04L 41/0654; H04L 41/12; H04L 41/14
See application file for complete search history.

(56) References Cited

U.S. PATENT DOCUMENTS

| | | | | |
|---|---|---|---|---|
| 2012/0155276 | A1* | 6/2012 | Vasseur | H04W 40/24 370/237 |
| 2019/0114247 | A1* | 4/2019 | Chen | H04L 41/12 |
| 2019/0312794 | A1* | 10/2019 | Bruun | H04L 41/044 |
| 2020/0364128 | A1* | 11/2020 | Vittal | G06F 11/3055 |

* cited by examiner

*Primary Examiner* — Padma Mundur
(74) *Attorney, Agent, or Firm* — Chamberlain, Hrdlicka, White, Williams & Aughtry

(57) ABSTRACT

Techniques described herein relate to a method for diagnosing and remediating service failures. The method includes identifying, by a diagnostic and remediation manager, a diagnostic event associated with a service of services; generating a dependency directed acyclic graph (DAG) associated with the service; generating health vectors associated with each node of the dependency DAG; updating the dependency DAG using the health vectors to generate an unhealthy subgraph; and remediating the service based on the unhealthy subgraph.

20 Claims, 8 Drawing Sheets

| Service A Example Performance Metrics 320 | | | | |
|---|---|---|---|---|
| Service A Identifier 322 | | | | |
| Metrics 324 | CPU Utilization 326 | Access 328 | Operations per Second 330 | Status 332 |
| Value Vector 334 | 50% 336 | False 338 | 1234 340 | Active 342 |
| Health Vector 344 | 1 346 | 0 348 | 0 350 | 1 352 |

FIG. 3B

METHOD AND SYSTEM FOR DIAGNOSING AND REMEDIATING SERVICE FAILURES

BACKGROUND

Computing devices may provide computer implemented services. The computer implemented services may be important to users of the computing devices. To provide the computer implemented services, the computing devices may host any number of services. Each of the services may perform a portion of the computer implemented services. The services may be dependent upon each other. The services may fail.

SUMMARY

In general, certain embodiments described herein relate to a method for diagnosing and remediating service failures. The method may include identifying, by a diagnostic and remediation manager, a diagnostic event associated with a service of services; generating a dependency directed acyclic graph (DAG) associated with the service; generating health vectors associated with each node of the dependency DAG; updating the dependency DAG using the health vectors to generate an unhealthy subgraph; and remediating the service based on the unhealthy subgraph.

In general, certain embodiments described herein relate to a system for diagnosing and remediating service failures. The system may include a service environment which may include one or more services. The system may also include a diagnostic and remediation manager, which includes a processor and memory, and is programmed to identify a diagnostic event associated with a service of the one or more services; generate a dependency directed acyclic graph (DAG) associated with the service; generate health vectors associated with each node of the dependency DAG; update the dependency DAG using the health vectors to generate an unhealthy subgraph; and remediate the service based on the unhealthy subgraph.

In general, certain embodiments described herein relate to a non-transitory computer readable medium that includes computer readable program code, which when executed by a computer processor enables the computer processor to perform a method for diagnosing and remediating service failures. The method may include identifying, by a diagnostic and remediation manager, a diagnostic event associated with a service of services; generating a dependency directed acyclic graph (DAG) associated with the service; generating health vectors associated with each node of the dependency DAG; updating the dependency DAG using the health vectors to generate an unhealthy subgraph; and remediating the service based on the unhealthy subgraph.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 3B-3C show diagrams of example data structures used by the example system in accordance with one or more embodiments of the invention.

DETAILED DESCRIPTION

Figure 1:
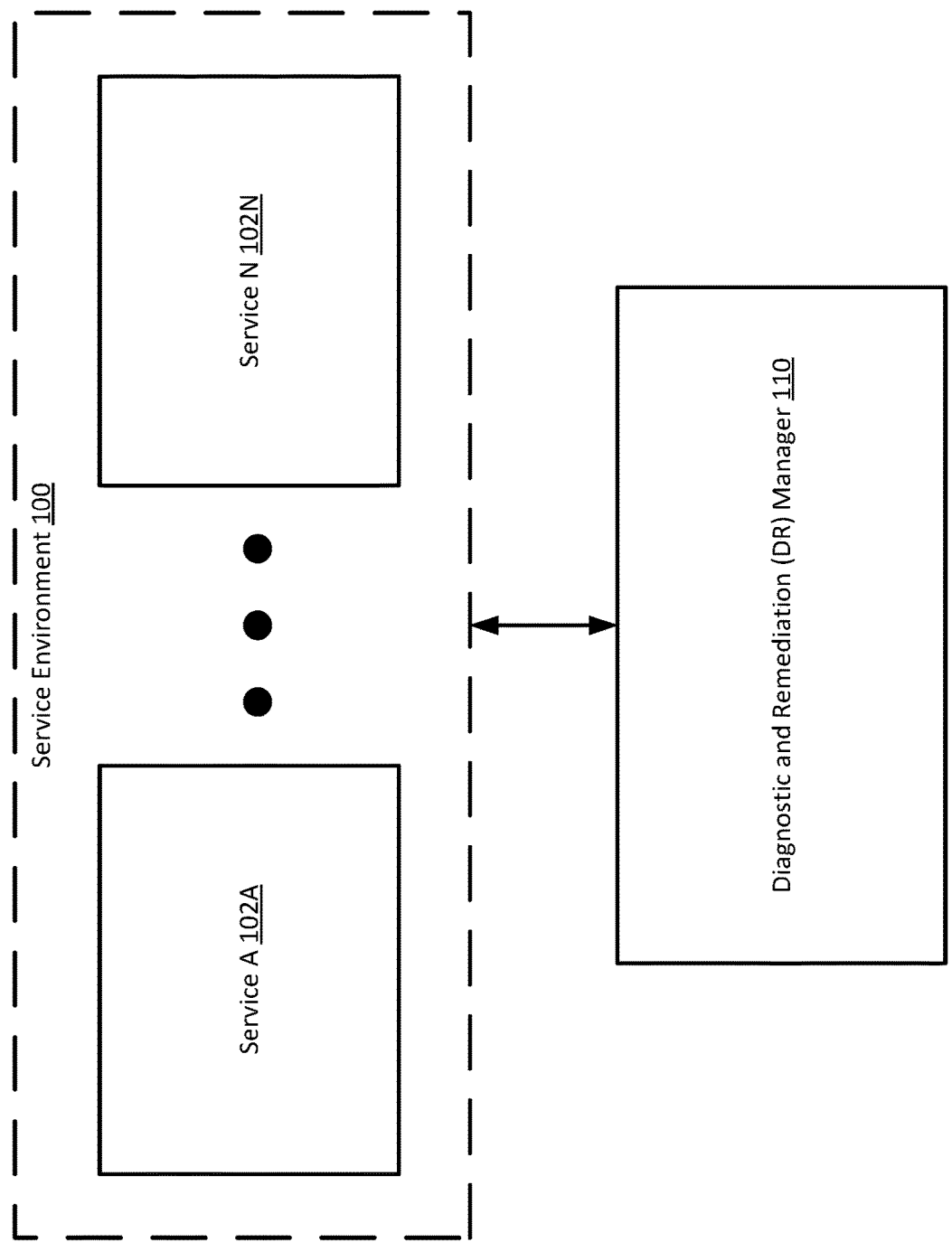
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In general embodiments of the invention relate to systems, methods, and non-transitory computer readable mediums for diagnosing and remediating service failures.

In service environments that host large quantities of interdependent services, limited resources may be allocated to diagnose and remediate failures of the services. The impact of service failures may be harmful to the service environment and may be undesirable by user of the service environment. With such service environments growing in size, the negative impact due to service failures and the complexity in remediating such failures may increase. Users of the service environment (e.g., IT administrators) may require significant amounts of time to manually remediate service failures in such service environments.

To address, at least in part, the problems discussed above, embodiments of the invention relate to a diagnostic and remediation (DR) manager that automatically diagnoses and remediates service failures.

FIG. 1 shows a diagram of a system in accordance with one or more embodiments of the invention. The system may include a service environment (100) and a diagnostic and remediation (DR) manager (110). The system may include other and/or additional devices and/or components without departing from the invention. The devices and components of the system illustrated in FIG. 1 may be operatively connected via any combinations of wired (e.g., Ethernet) and/or wireless (e.g., WAN) connections without departing from the invention. Each of the aforementioned components of the system of FIG. 1 is discussed below.

In one or more embodiments of the invention, the service environment (100) is implemented as one or more computing devices. In one or more embodiments of the invention, a computing device is any device, portion of a device, or any set of devices capable of electronically processing instructions and may include any number of components, which include, but are not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors (not shown) for obtaining data, and/or any combination thereof. For additional information regarding computing devices, refer to FIG. 4.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a hyperconverged infrastructure, a cluster, a virtual machine, a logical container (e.g., for one or more applications), and/or any other type of device with the aforementioned requirements.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments of the invention, the service environment (100) includes the functionality to perform computer implemented services. The computer implemented services may include, for example, database services, electronic communication services, inferencing services, calendar services, etc. The computer implemented services may include other and/or additional types of computer implemented services without departing from the invention. The service environment may include other and/or additional functionalities without departing from the invention.

In one or more embodiments of the invention, the computer implemented services are separated into individual services. The service environment (100) may include any quantity of services without departing from the invention.

For example, the service environment (100) may include service A (102A) and service N (102N). The services (102A, 102N) may include, for example, management services, control services, data mover services, discovery services, monitoring services, and other and/or additional types of services without departing from the invention. The services (102A, 102N) may include any number of instances without departing from the invention. For example, the service environment (100) may include one instance of service A (102A) and ten instances of service N (102N).

A service (e.g., 102A) may be dependent upon one or more services (e.g., 102N). For example, a data mover service may be dependent upon a control service and a management service, and the control service may be dependent upon the management service. In other words, the management service may provide instructions to the control service to move data from a first location to a second location, the control service may obtain the instructions, and in response, may initiate the performance of the instructions using the data mover service. In response to the initiation, the data mover may move the data from the first location to the second location.

The services (e.g., service A (102A) and service N (102N)) may be implemented as computer instructions, e.g., computer code, stored on a storage of the service environment (100) that when executed by a processor(s) of the service environment (100) cause the service environment (100) to provide the functionality of the services (e.g., 102A, 102N) described throughout this application.

In one or more embodiments of the invention, the DR manager (110) is implemented as a computing device. The computing device may be an embodiment of the computing devices discussed above. For additional information regarding computing devices, refer to the above discussion or to FIG. 4.

In one or more embodiments of the invention, the DR manager (110) is implemented as a logical device. The logical device may utilize the computing resources of any number of computing devices (e.g., of the service environment or another entity) and thereby provide the functionality of the DR manager (110) described throughout this application.

In one or more embodiments of the invention, the DR manager (110) includes the functionality to perform service diagnostic and remediation services. To perform the service diagnostic and remediation services, the DR manager (110) may include the functionality to provide and/or obtain instructions and data to and/or from the services (e.g., 102A, 102N), entity(ies) managing the services (not shown in FIG. 1), and/or the service environment (100). For additional information regarding the performance of service diagnostic and remediation services, refer to FIGS. 2A-2C. The DR manager (110) may include other and/or additional functionalities without departing from the invention.

Figure 2A:
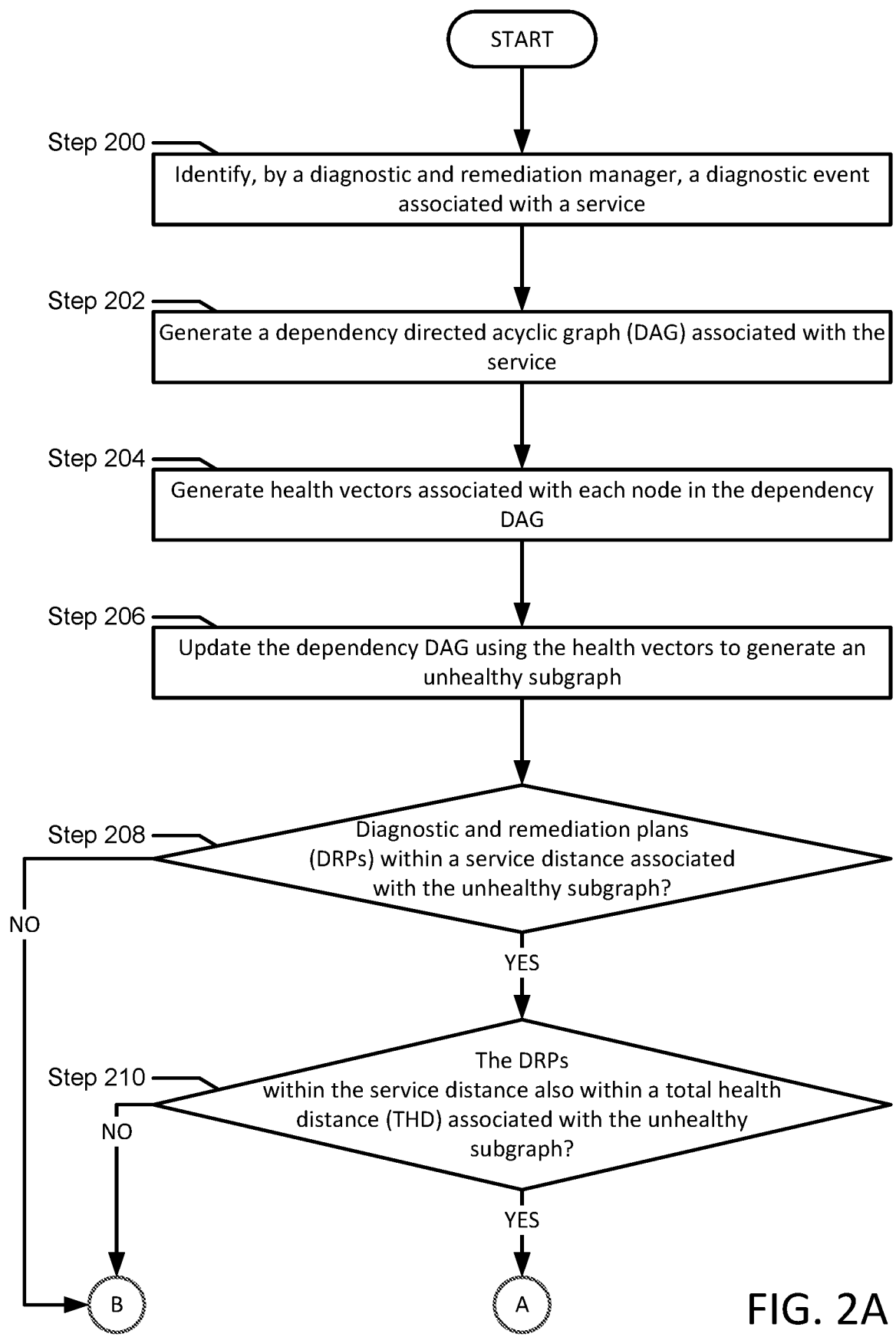
FIGS. 2A-2C show flowcharts of a method for diagnosing and remediating services in accordance with one or more embodiments of the invention.
Figure 2B:
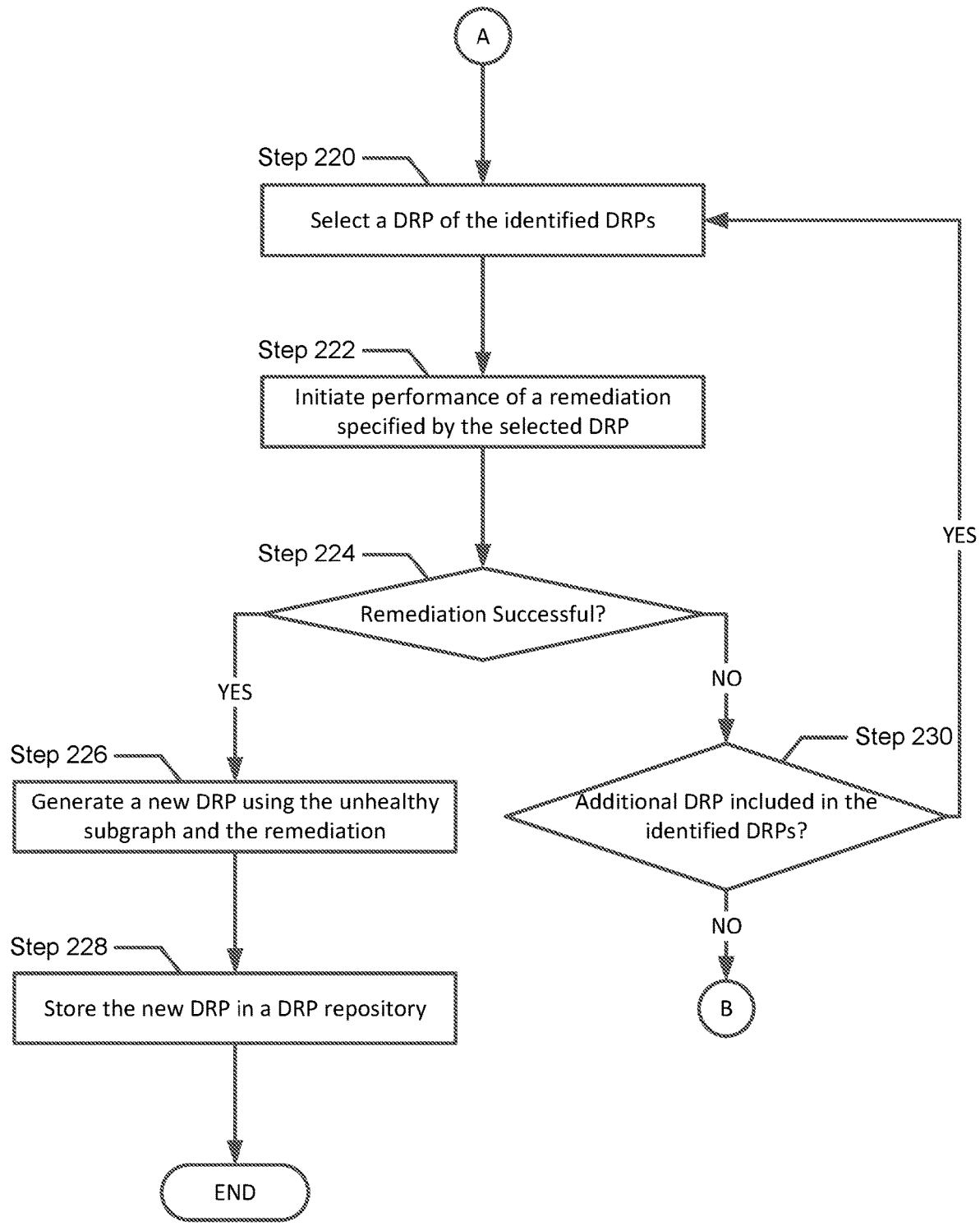
Figure 2C:
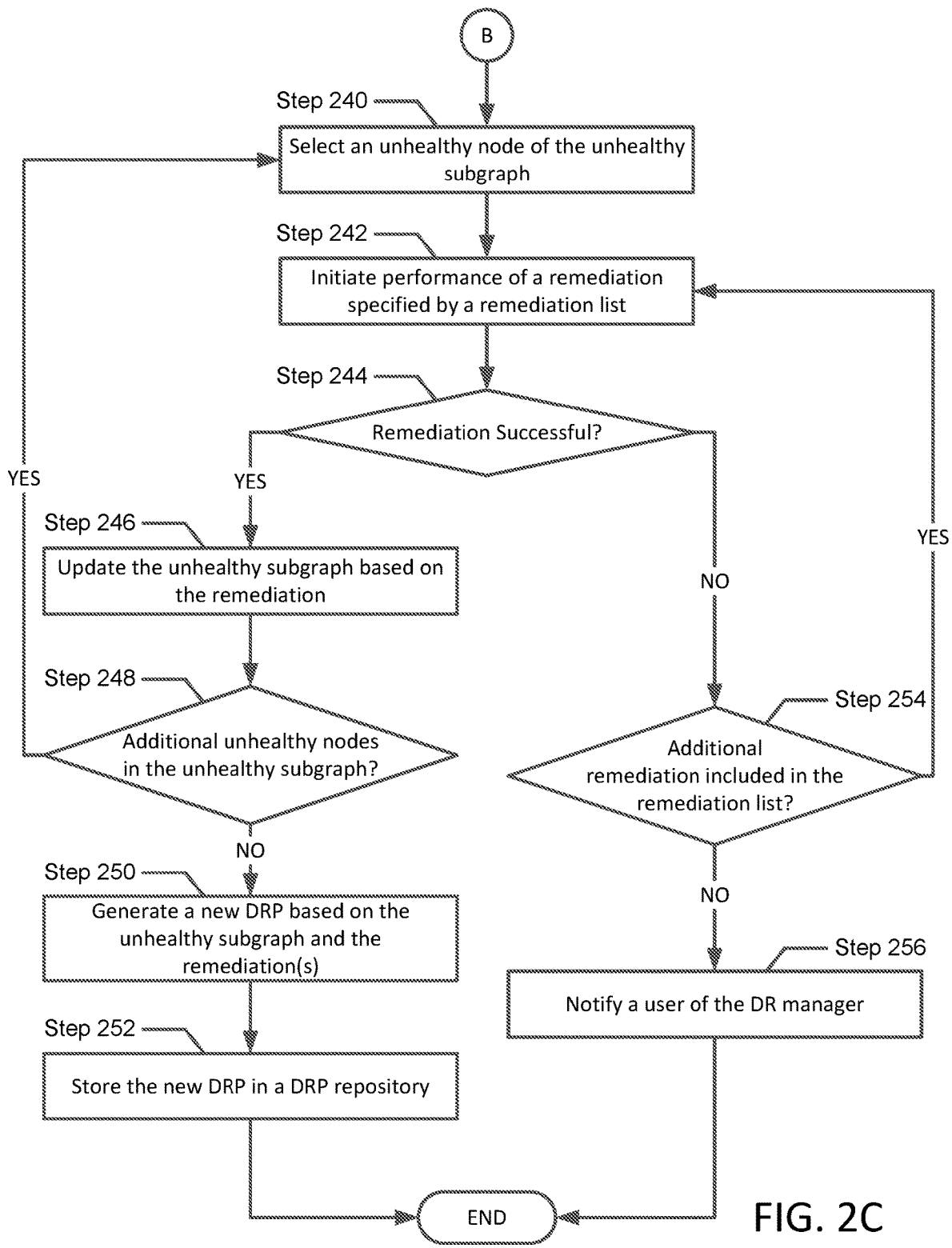

FIGS. 2A-2C show flowcharts of a method for diagnosing and remediating services in accordance with one or more embodiments of the invention. The method depicted in FIGS. 2A-2C may be performed by a DR manager (110, FIG. 1). All, or a portion, of the method of FIGS. 2A-2C may be performed by other components illustrated in FIG. 1 without departing from the invention.

While the various steps in the flowcharts shown in FIGS. 2A-2C are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

Turning to FIG. 2A, in Step 200, a diagnostic event associated with a service is identified by the DR manager.

In one or more embodiments of the invention, a service fails. A service may fail for any reason without departing from the invention. For example, a service failure may include, inaccessibility of a service, inactivity of a service, low operations per second, lack of computing resources associated with a service (e.g., storage, memory, processors, etc.), and any other type of service failure without departing from the invention. A service failure may be identified by attempting to access a service and/or using performance metrics associated with a service generated through monitoring of the service.

In one or more embodiments of the invention, performance metrics are one or more data structures that include performance information associated with the services. The performance information associated with a service may include, for example, number of operations per second, memory usage, storage usage, processor usage, service status, and/or other types of information associated with the performance of the service. The performance information may be associated with thresholds and/or subsets of non-scalar values (e.g., strings) that may be associated with healthy or optimal performance of a service. A service associated with performance information that are within the thresholds and/or subsets of non-scalar values may be referred to as a healthy service. A service associated with performance information that is not within one or more thresholds and/or subsets of non-scalar values may be referred to as an unhealthy service (i.e., a service failure). The performance metrics may be generated by the services, a monitoring service or other entity(ies) that monitors the services, and/or the DR manager. The performance metrics may be used to identify service failures and to generate health vectors (discussed below). The performance metrics may include other and/or additional information associated with the services and may be used for other and/or additional purposes without departing from the invention.

In one or more embodiments of the invention, another service, a monitoring service, or other entity(ies) (e.g., users of the service environment) that monitor and/or attempt to access a service may identify that a service has failed based on a failed access attempt or performance metrics associated with the failed service. In response to identifying the failed service, the other service, the monitoring service, or other entity(ies) may send a message to the DR manager. The message may include a notification that the service has failed. The message may include the service identifier (e.g., a unique combination of bits, a unique string, etc.) associated with the failed service. In response to obtaining the message, the DR manager may request and obtain performance metrics associated with the failed service. The performance metrics may include performance metrics associated with services that include a dependency associated with the failed service. The message may be provided to the DR manager using any appropriate method of data transmission without departing from the invention. As an example, the other service, the monitoring service, or the other entity(ies) may communicate the message as network data traffic units over a series of network devices that operatively connect the other service, the monitoring service, or the other entity(ies) to the DR manager. The DR manager may identify obtaining the message as the diagnostic event associated with the service. The DR manager may identify the diagnostic associated with the service via other and/or additional methods without departing from the invention.

In one or more embodiments of the invention, the DR manager monitors the performance of the services of the service environment. The DR manager may generate and/or obtain performance metrics associated with the services. The DR manager may check the performance metrics to determine whether the performance metrics include performance information outside of thresholds or non-scalar value subsets that would indicate whether a service has failed. The DR manager may identify the determination that the performance information of the performance metrics associated with a service indicate that the service has failed as the diagnostic event associated with the service. The DR manager may identify the diagnostic associated with the service via other and/or additional methods without departing from the invention.

In Step 202, a dependency directed acyclic graph (DAG) associated with the service is generated.

In one or more embodiments of the invention, a dependency DAG is one or more data structures that includes a hierarchical relationship of dependencies of services that are associated with the failed service. More specifically, each node included in the dependency DAG may be associated with a service that is dependent upon the failed service or which the failed service is dependent. The dependency DAG may include the service identifier associated with each service that has a dependency associated with the failed service. The dependency DAG may include any number of nodes associated with any number of services that include dependencies associated with the failed service. The dependency DAG may be used to generate an unhealthy subgraph (discussed below). For multiple instances of services, the dependency DAG may normalize or collapse nodes associated with multiple instances of a service into a single node. The dependency DAG may include other and/or additional information without departing from the invention.

For example, the failed service identified in the diagnostic event of Step 200 may be a control service. As such, the control service may depend on a management service. The control service may also be dependent upon by four instances of data mover services. A dependency DAG associated with the control service may include a node associated with the management service at the top hierarchical position of the dependency DAG. The dependency DAG may further include a node associated with the control service branching down from the node associated with the management service. Finally, the dependency DAG may further include a node associated with the four instances of the data mover services branching down from the node associated with the control service. As a result, the dependency DAG may include a top node associated with the management service, a middle node associated with the control service, and a bottom node associated with the four instances of the data mover services.

In one or more embodiments of the invention, the DR manager generates the dependency DAG associated with the service using communication information associated with the services in the service environment. The communication information associated with a service may indicate which services the service communicates with and/or is otherwise connected to. The communication information may be generated using any appropriate method of facilitating communication between services without departing from the invention. As an example, the communication information may be generated and/or obtained using a service mesh that includes a communication manager operatively connected to proxies associated with each service that manage the communication between each service. The DR manager may use the communication information associated with the service to identify which services of the service environment the failed service communicates with (i.e., which services include a dependency associated with the service). The DR manager may generate a dependency DAG based on the dependencies specified by the communication information. The DR manager may generate a dependency DAG via other and/or additional methods without departing from the invention.

In Step 204, health vectors associated with each node in the dependency DAG are generated.

In one or more embodiments of the invention, the DR manager uses performance metrics associated with each service included in the dependency DAG to generate health vectors. The DR manager may generate and/or obtain (i.e., from the services, monitoring services, or other entities that may monitor the performance of the services) performance metrics associated with each service in the dependency DAG using the service identifiers and communication information associated with the services. As discussed above, the performance information included in the performance metrics may be associated with thresholds or subset of non-scalar values that indicate whether a service is healthy. For each service, the DR manager uses such metrics and thresholds or subset of scalar values to generate a health vector. The health vectors associated with each node in the dependency DAG may be generated via other and/or additional methods without departing from the invention.

In one or more embodiments of the invention, a health vector is one or more data structures that include one or more dimensions associated with each metric included in the performance information of the performance metrics for a particular service. For each dimension and/or combination of dimensions, the health vector may include a Boolean value (e.g., a bit) set to zero or false if the metric associated with the dimension is within the threshold or included in the subset of non-scalar values (i.e., metric is healthy), and a Boolean value (e.g., a bit) of one or true if the metric is not within the threshold or included in the subset of non-scalar values (i.e., metric is unhealthy). In other embodiments of the invention, the reverse Boolean values may denote whether a metric is healthy or unhealthy (e.g., Boolean value set to zero or false if the metric is unhealthy and Boolean value set to one or true if the metric is healthy). The thresholds and/or the subset of non-scalar values associated with the performance metrics may be generated or configured by, for example, a user of the system (e.g., an IT orchestrator) and may be stored in a storage of the DR manager. The health vector may include any number of dimensions associated with any number of metrics. Health vectors associated with different service may include similar and/or different dimensions associated with similar and/or different metrics. The health vectors may include other and/or additional information without departing from the invention. The DR manager may set the Boolean values for each dimension of the health vectors based on the performance metrics and the performance metrics thresholds and/or subset of non-scalar values when generating the health vectors.

In scenarios in which the dependency DAG includes a collapsed node associated with multiple instances of a service, the DR manager may: (i) use the health vector of the unhealthiest instance (i.e., the health vector with the most zeros), (ii) use the health vector of the healthiest instance (i.e., the health vector with the least zeros), or (iii) merge all the health vectors to generate a health vector that includes the unhealthy dimensions that appear in any one of the health vectors for the instances of the service. The DAG manager may use other and/or additional methods to generate health vectors for collapsed nodes in the dependency DAG without departing from the invention.

As a simple example, a health vector associated with a service may include a dimension for service status and operations per second. The performance metrics associated with the service specify that the status of the service is "Inactive". The performance metric associated with status is also associated with a subset of strings associated with the service status that include "Active" and "Standby". As a result, the health vector dimension for service status may include a value of one (i.e., unhealthy), as "Inactive" is not included in the subset of strings. Additionally, the performance metrics associated with the service indicates that the operations per second of the service is 1234 operations per second. The performance metric associated with operations per second is also associated with an operations per second threshold between five and 5000 operations per second. As a result, the health vector dimension for operations per second may include a value of zero (i.e., healthy), as 1234 operations per second is within the threshold of five and 5000 operations per second.

In Step 206, the dependency DAG is updated using the health vectors to generate an unhealthy subgraph.

In one or more embodiments of the invention, the DR manager includes the health vector associated with each service to the node corresponding to the service. The DR manager may delete the health vectors and the nodes of the dependency DAG that correspond to services that are healthy. The health vectors that correspond to services that are healthy may not include any Boolean values of one (i.e., all metrics within thresholds and/or subset of non-scalar values). As a result, the dependency DAG is updated to generate an unhealthy subgraph. The unhealthy subgraph may include the nodes and the health vectors of all services that are unhealthy, and therefore, may specify those services of the dependency graph that are unhealthy. The dependency DAG may be updated using the health vectors to generate an unhealthy subgraph via other and/or additional methods without departing from the invention.

In Step 208, a determination is made as to whether diagnostic and remediation plans (DRPs) are within a service distance associated with the unhealthy subgraph.

In one or more embodiments of the invention, DRP is one or more data structures that includes information associated with previous service failures. The DRP may include, for example, an ordered list of services (i.e., service identifiers) associated with the previous service failure (i.e., services included in a previous unhealthy subgraph), health vectors associated with each service, auto remediation statuses associated with each service, and remediation identifiers (e.g., a unique combination of bits associated with a particular remediation, discussed below) associated with each service. An auto remediation status may be a tag, flag, or a Boolean value that may indicate whether the associated service was remediated as a result of a remediation performed on another service in which the service is dependent. The DRP may include other and/or additional information regarding the diagnosis and remediation of previous service failures without departing from the invention.

In one or more embodiments of the invention, the DR manager maintains a DRP repository. A DRP repository may be one or more data structures that include DRPs. The DR manager may store the DRP repository in a storage of the DR manager or a storage operatively connected to the DR manager. The storage may be any type of storage (e.g., hard disk drive, RAM, etc.) without departing from the invention. The DRP repository may include other and/or additional information without departing from the invention.

In one or more embodiments of the invention, the DR manager determines whether there are DRPs within a service distance associated with the unhealthy subgraph by comparing the list of services in the DRP with the services included in the unhealthy subgraph. A service distance may refer to the maximum quantity of services which may be different between the unhealthy subgraph and the list of services in the DRPs. The service distance may be configurable by a user of the system. The service distance may be zero (i.e., require an exact match of services between the unhealthy subgraph and the DRPs to be within the service distance). The DR manager may compare the list of services in each DRP in the DRP repository with the unhealthy subgraph to identify any DRPs that are within the configurable service distance. To increase the efficiency of the comparisons when the service distance is zero, the DR manager may generate hashes of the service identifiers included in the unhealthy subgraph and the services identifiers of the ordered list of services in the DRPs. The DR manager may compare the hashes to identify any matches in the hash associated with the unhealthy subgraph and the hashes associated with the DRPs.

If the DR manager identifies a match in the hashes or identifies a DRP with a list of services that includes less than or equal to the maximum quantity of different services compared to the unhealthy subgraph, then the DR manager may determine that there are DRPs within a service distance associated with the unhealthy subgraph. If the DR manager does not identify a match in the hashes or does not identify a DRP with a list of services that includes less than or equal to the maximum quantity of different services compared to the unhealthy subgraph, then the DR manager may determine that there are no DRPs within a service distance associated with the unhealthy subgraph. The determination as to whether DRPs are within a service distance associated with the unhealthy subgraph may be made via other and/or additional methods without departing from the invention.

In one or more embodiments of the invention, if it is determined that DRPs are within a service distance associated with the unhealthy subgraph, then the method proceeds to Step 210. In one or more embodiments of the invention, if it is determined that no DRPs are within a service distance associated with the unhealthy subgraph, then the method proceeds to Step 240 of FIG. 2C.

In Step 210, a determination is made as to whether DRPs are within a total health distance (THD) associated with the unhealthy subgraph.

In one or more embodiments of the invention, the DR manager determines whether there are DRPs within a THD associated with the unhealthy subgraph by comparing the health vectors in the DRPs within the service distance with the health vectors included in the unhealthy subgraph. A THD may refer to the maximum quantity of different values of health vector dimensions between all the health vectors included in the unhealthy subgraph and all the health vectors in a DRP. The THD may be configurable by a user of the system. The THD may be zero (i.e., require an exact match of health vectors between the unhealthy subgraph and the DRPs to be within the THD). The DR manager may compare the health vectors in each DRP that was within the service distance associated with the unhealthy subgraph with the health vectors included in the unhealthy subgraph to identify any DRPs that are within the configurable THD. For health vectors included in a DRP but not in the unhealthy subgraph or vice versa, the size of the extra health vector may be added to the total health distance.

To increase the efficiency of the comparisons, the DR manager may generate single numbers, strings, or vectors that provides a low resolution representation of all health vectors included in each DRP within the service distance and the unhealthy subgraph (e.g., via a Bloom filter, 64-bit low resolution vector, etc.). The DR manager may compare the single numbers, strings, or vectors associated with the DRPs with the unhealthy subgraph to eliminate DRPs with the single numbers, strings, or vectors that do not match the single number, string, or vector of the unhealthy subgraph. The DR manager may then compare the health vectors of the remaining DRPs with the health vectors of the unhealthy subgraph.

If the DR manager identifies a DRP with health vectors that include less than or equal to the maximum quantity of different health vector values compared to the health vectors of the unhealthy subgraph, then the DR manager may determine that there are DRPs within a THD associated with the unhealthy subgraph. If the DR manager does not identify a DRP with health vectors that include less than or equal to the maximum quantity of different health vector values compared to the health vectors of the unhealthy subgraph, then the DR manager may determine that there are no DRPs within a THD associated with the unhealthy subgraph. The determination as to whether DRPs are within a THD associated with the unhealthy subgraph may be made via other and/or additional methods without departing from the invention.

In one or more embodiments of the invention, if it is determined that DRPs are within a THD associated with the unhealthy subgraph, then the method proceeds to Step 220 of FIG. 2B. In one or more embodiments of the invention, if it is determined that no DRPs are within a THD associated with the unhealthy subgraph, then the method proceeds to Step 240 of FIG. 2C.

Turning to FIG. 2B, in Step 220, a DRP of the identified DRPs is selected.

In one or more embodiments of the invention, the DR manager selects a DRP of the identified DRPs that are within the service distance and the THD associated with the unhealthy subgraph. The DR manager may select a DRP that is associated with the smallest service distance and THD (i.e., DRP that is the closest to the unhealthy subgraph). If multiple DRPs are associated with the smallest service distance and THD, then the DR manager may randomly select one of the DRPs associated with the smallest service distance and THD. If multiple selections of DRPs have been made, the DR manager may prevent repeated selections of the same DRPs. A DRP of the identified DRPs may be selected via other and/or additional methods without departing from the invention.

In Step 222, performance of a remediation specified by the selected DRP is initiated.

In one or more embodiments of the invention, a remediation is one or more actions performed to remediate a failed (i.e., unhealthy) service. A remediation may include, for example, killing a service, restarting a service, change a configuration of a service, upgrade a service, install a patch, increase or decrease resources (e.g., RAM, CPU, etc.) associated with a service, throttle communication associated with a service, temporarily block access to a resource or another service, and run one or more scripts. A remediation may include other and/or additional actions performed to remediate a failed service without departing from the invention.

As discussed above, the DRP may include one or more remediation identifiers associated with one or more services in the ordered list of services. A remediation identifier may be, for example, a unique combination of bits that specify a particular remediation. The DR manager may send a message to each of the services or an entity that manages the services. The message may include instructions for performing the remediation(s) specified by the DRP associated with the services. The message may be provided to the services or the entity managing the services using any appropriate method of data transmission without departing from the invention. As an example, the DR manager may communicate the message as network data traffic units over a series of network devices that operatively connect the services to the DR manager. Performance of a remediation specified by the selected DRP may be initiated via other and/or additional methods without departing from the invention.

If a remediation attempt fails, additional attempts for remediation may be tried. The DR manager may track remediations performed for each service, and may prevent the performance of the same remediation for the same service if a new DRP specifies the same remediation for the service. The DR manager may also track services that are healthy as a result of the performance of previous remediations associated with previous DRPs, and therefore, may not perform a remediation on a healthy service.

In Step 224, a determination is made as to whether the remediation was successful.

In response to obtaining the message sent in Step 222, a remediation associated with the one or more services may be performed. The DR manager may wait a configurable amount of time after the remediations are performed in order to allow the remediations to take effect on the services. After the configurable amount of time, the DR manager may obtain updated performance metrics associated with the services. The DR manager may generate updated health vectors associated with each service, including the services for which no remediation was performed as the remediation of one service might affect the health of another service. The DR manager may associate the updated health vectors with the remediation identifier associated with remediation performed in Step 222. The DR manager may check the updated health vectors to determine whether the updated health vectors indicate that the services associated with the unhealthy subgraph are healthy (i.e., include all zeros). If the updated health vectors indicate that all services associated with the unhealthy subgraph are healthy, then the DR manager may determine that the remediation was successful. If the updated health vectors do not indicate that all services associated with the unhealthy subgraph are healthy, then the DR manager may determine that the remediation was not successful.

The performance of the one or more remediations may be partially successful, (i.e., a portion of the services associated with the unhealthy subgraph are healthy as a result of the performance of the one or more remediations). The DR manager may associate the remediation identifier corresponding to the remediation that was performed to successfully remediate the services with the services. The performance of a remediation may have an undesirable effect on one or more services. In such scenarios, the remediation may be reversed. For example, if a service was upgraded and now has more unhealthy values in its updated health vector, then the DR manager may initiate a restoration of the service to its original version. The determination as to whether the remediation was successful may be made via other and/or additional methods without departing from the invention.

In one or more embodiments of the invention, if it is determined that the remediation was successful, then the method proceeds to Step 226. In one or more embodiments of the invention, if it is determined that the remediation was not successful, then the method proceeds to Step 230.

In Step 226, a new DRP is generated using the unhealthy subgraph and the remediation.

In one or more embodiments of the invention, the DR manager generates a new DRP. The DR manager includes the ordered list of services included in the unhealthy subgraph in the new DRP. For each service included in the new DRP, the DR manager also includes: (i) the remediation identifier associated with the remediation for which successfully remediated the service, (ii) the original health vector associated with the service, and (iii) an auto remediation status if the service was remediated as a result of the performance of a remediation on another service. The new DRP may be generated using the unhealthy subgraph and the remediation via other and/or additional methods without departing from the invention.

In Step 228, the new DRP is stored in a DRP repository.

In one or more embodiments of the invention, the DR manager stores the new DRP in the DRP repository. Prior to storing the new DRP, the DR manager may compare the new DRP with previous DRPs included in the DRP repository. If a previous DRP matches the new DRP, then the DR manager may delete the new DRP and not store the new DRP in the DRP repository to avoid storing identical DRPs in the DRP repository. If no previous DRPs match the new DRP, then the DR manager may store the new DRP in the DRP repository. The new DRP may be stored in the DRP repository via other and/or additional methods without departing from the invention.

In one or more embodiments of the invention, the method ends following Step 228.

In Step 230, a determination is made as to whether an additional DRP is included in the identified DRPs.

In one or more embodiments of the invention, the DR manager tracks the DRPs that have been used to attempt to remediate the services of the unhealthy subgraph. The DR manager may, for example, tag the DRPs that have been used. The DR manager may check the identified DRPs that are within the service distance and within the THD associated with the unhealthy subgraph. If the DR manager identifies a DRP of the identified DRPs that was not previously used to try and remediate the services of the unhealthy subgraph, then the DR manager may determine that an additional DRP is included in the identified DRPs. If the DR manager does not identify a DRP of the identified DRPs that was not previously used to try and remediate the services of the unhealthy subgraph, then the DR manager may determine that an additional DRP is not included in the identified DRPs. The determination as to whether an additional DRP is included in the identified DRPs may be made via other and/or additional methods without departing from the invention.

In one or more embodiments of the invention, if it is determined that additional DRPs are included in the identified DRPs, then the method proceeds to Step 220. In one or more embodiments of the invention, if it is determined that no additional DRPs are included in the identified DRPs, then the method proceeds to Step 240 of FIG. 2C.

Turning to FIG. 2C, in Step 240, an unhealthy node of the unhealthy subgraph is selected.

In one or more embodiments of the invention, the DR manager selects the bottommost node in the unhealthy subgraph. As discussed above, the unhealthy subgraph includes a hierarchical relationship of dependencies between the nodes. By selecting the bottommost node, successful remediation of the bottommost node may result in remediation of nodes higher in the unhealthy subgraph that are associated with the bottommost node. An unhealthy node of the unhealthy subgraph may be selected via other and/or additional methods without departing from the invention.

In Step 242, performance of a remediation specified by a remediation list is initiated.

In one or more embodiments of the invention, a remediation list is one or more data structures that include a list of remediation identifiers associated with remediations. The remediation list may include other and/or additional information without departing from the invention. The remediation list may be generated by a user of the DR manager. The remediation list may be used by the DR manager to perform remediations for services in the unhealthy subgraph. The DR manager may select a remediation, or combination of remediations, specified by the remediation list. The DR manager may randomly select remediations specified by the remediation list. The remediation list may specify a particular order in which the DR manager may select the remediations. The DR manager may track the remediations used to not repeat remediations. The DR manager may send a message to the service or an entity that manages the service associated with the selected node of the unhealthy subgraph. The message may include instructions for performing the remediation(s) selected by the DR manager. The message may be provided to the service or the entity managing the service using any appropriate method of data transmission without departing from the invention. As an example, the DR manager may communicate the message as network data traffic units over a series of network devices that operatively connect the service to the DR manager. Performance of a remediation specified by the remediation list may be initiated via other and/or additional methods without departing from the invention.

The DR manager may track remediations performed for each service, and may not perform the same remediation for the same service if a new DRP specifies the same remediation for the service. The DR manager may also track services that are healthy as a result of the performance of previous remediations associated with previous DRPs, and therefore, may not perform a remediation on a healthy service.

In Step 244, a determination is made as to whether the remediation was successful.

In response to obtaining the message sent in Step 242, the remediation associated with the service may be performed. The DR manager may wait a configurable amount of time after the remediation are performed in order to allow the remediation to take effect on the services. After the configurable amount of time, the DR manager may obtain updated performance metrics associated with all the services included in the unhealthy subgraph. The DR manager may generate updated health vectors associated with each service, including the services for which no remediation was performed as the remediation of one service might affect the health of another service. The DR manager may associate the updated health vectors with the remediation identifier associated with remediation performed in Step 242. The DR manager may check the updated health vector associated with the service to determine whether the updated health vector indicates that the service for which the remediation was performed is healthy (i.e., include all zeros). If the updated health vector indicates that the service is healthy, then the DR manager may determine that the remediation was successful. If the updated health vector does not indicate that the service is healthy, then the DR manager may determine that the remediation was not successful.

The performance of a remediation may have an undesirable effect on the service. In such scenarios, the remediation may be reversed. For example, if a service was upgraded and now has more unhealthy values in its updated health vector, then the DR manager may initiate a restoration of the service to its original version. The determination as to whether the remediation was successful may be made via other and/or additional methods without departing from the invention.

In one or more embodiments of the invention, if it is determined that the remediation was successful, then the method proceeds to Step 246. In one or more embodiments of the invention, if it is determined that the remediation was not successful, then the method proceeds to Step 254.

In Step 246, the unhealthy subgraph is updated based on the remediation.

In one or more embodiments of the invention, the DR manager updates the unhealthy subgraph to include indications for all services that are now healthy as a result of the remediation. The DR manager may, for example, set a flag on the nodes associated with remediated services or tag nodes associated with remediated services to track the services that are remediated in the unhealthy subgraph. As a result, the DR manager may identify services which are remediated and services that are still unhealthy. The unhealthy subgraph may be updated based on the remediation via other and/or additional methods without departing from the invention.

In Step 248, a determination is made as to whether additional unhealthy nodes are included in the unhealthy subgraph.

As discussed above, the DR manager may update the unhealthy subgraph to indicate nodes associated with services that were remediated. To determine whether additional unhealthy nodes are included in the unhealthy subgraph, the DR manager may check the updated unhealthy subgraph for nodes which include no indications (e.g., no flags or no tags) that they were remediated. If the DR manager identifies a node in the unhealthy subgraph that does not include the aforementioned indications that the service associated with the node was remediated, then the DR manager may determine that an additional unhealthy node is included in the unhealthy subgraph. If the DR manager does not identify a node in the unhealthy subgraph that does not include the aforementioned indications that the service associated with the node was remediated, then the DR manager may determine that an additional unhealthy node is not included in the unhealthy subgraph. The determination as to whether additional unhealthy nodes are included in the unhealthy subgraph may be made via other and/or additional methods without departing from the invention.

In one or more embodiments of the invention, if it is determined that additional unhealthy nodes are included in the unhealthy subgraph, then the method proceeds to Step 240. In one or more embodiments of the invention, if it is determined that no additional unhealthy nodes are included in the unhealthy subgraph, then the method proceeds to Step 250.

In Step 250, a new DRP is generated based on the unhealthy subgraph and the remediation(s).

In one or more embodiments of the invention, the DR manager generates a new DRP. The DR manager includes the ordered list of services included in the unhealthy subgraph in the new DRP. For each service included in the new DRP, the DR manager also includes: (i) the remediation identifier associated with the remediation for which successfully remediated the service, (ii) the original health vector associated with the service, and (iii) an auto remediation status if the service was remediated as a result of the performance of a remediation on another service. The new DRP may be generated using the unhealthy subgraph and the remediation via other and/or additional methods without departing from the invention.

In Step 252, the new DRP is stored in the DRP repository.

In one or more embodiments of the invention, the DR manager stores the new DRP in the DRP repository. Prior to storing the new DRP, the DR manager may compare the new DRP with previous DRPs included in the DRP repository. If a previous DRP matches the new DRP, then the DR manager may delete the new DRP and not store the new DRP in the DRP repository to avoid storing identical DRPs in the DRP repository. If no previous DRPs match the new DRP, then the DR manager may store the new DRP in the DRP repository. The new DRP may be stored in the DRP repository via other and/or additional methods without departing from the invention.

In one or more embodiments of the invention, the method ends following Step 252.

In Step 254, a determination is made as to whether an additional remediation is included in the remediation list.

As discussed above, the DR manager may track previously used remediations of the remediation list. The DR manager may indicate that a remediation of the remediation list was used by, for example, tagging the remediation identifier associated with the used remediation in the remediation list. The DR manager may check the remediation list to identify remediation identifiers that do not include the aforementioned indications that they were previously used. If the DR manager identifies a remediation identifier with no indication that it was previously used in the remediation list, then the DR manager may determine that an additional remediation is included in the remediation list. If the DR manager does not identify a remediation identifier with no indication that it was previously used in the remediation list, then the DR manager may determine that an additional remediation is not included in the remediation list. The determination as to whether an additional remediation is included in the remediation list may be made via other and/or additional methods without departing from the invention.

In one or more embodiments of the invention, if it is determined that an additional remediation is included in the remediation list, then the method proceeds to Step 242. In one or more embodiments of the invention, if it is determined that an additional remediation is not included in the remediation list, then the method proceeds to Step 256.

In Step 256, a user of the DR manager is notified.

In scenarios in which all remediations included in the remediation list were attempted and none were successful, the DR manager may notify a user of the DR manager (e.g., an IT administrator) that the service is still unhealthy and no remediation was successful. To notify the user, the DR manager may send a message to the user, the message may include a notification that the service is unhealthy and no remediation included in the remediation list was successful in remediating the service. The message may include descriptions of remediations that were performed but were unsuccessful so that the user may not repeat remediations that were unsuccessful. The message may include other and/or additional information (e.g., the service identifier, the remediation list, performance metrics associated with the service, etc.) without departing from the invention. The user of DR manager may be notified via other and/or additional methods without departing from the invention.

In one or more embodiments of the invention, the method ends following Step 256.

Examples

Figure 3A:
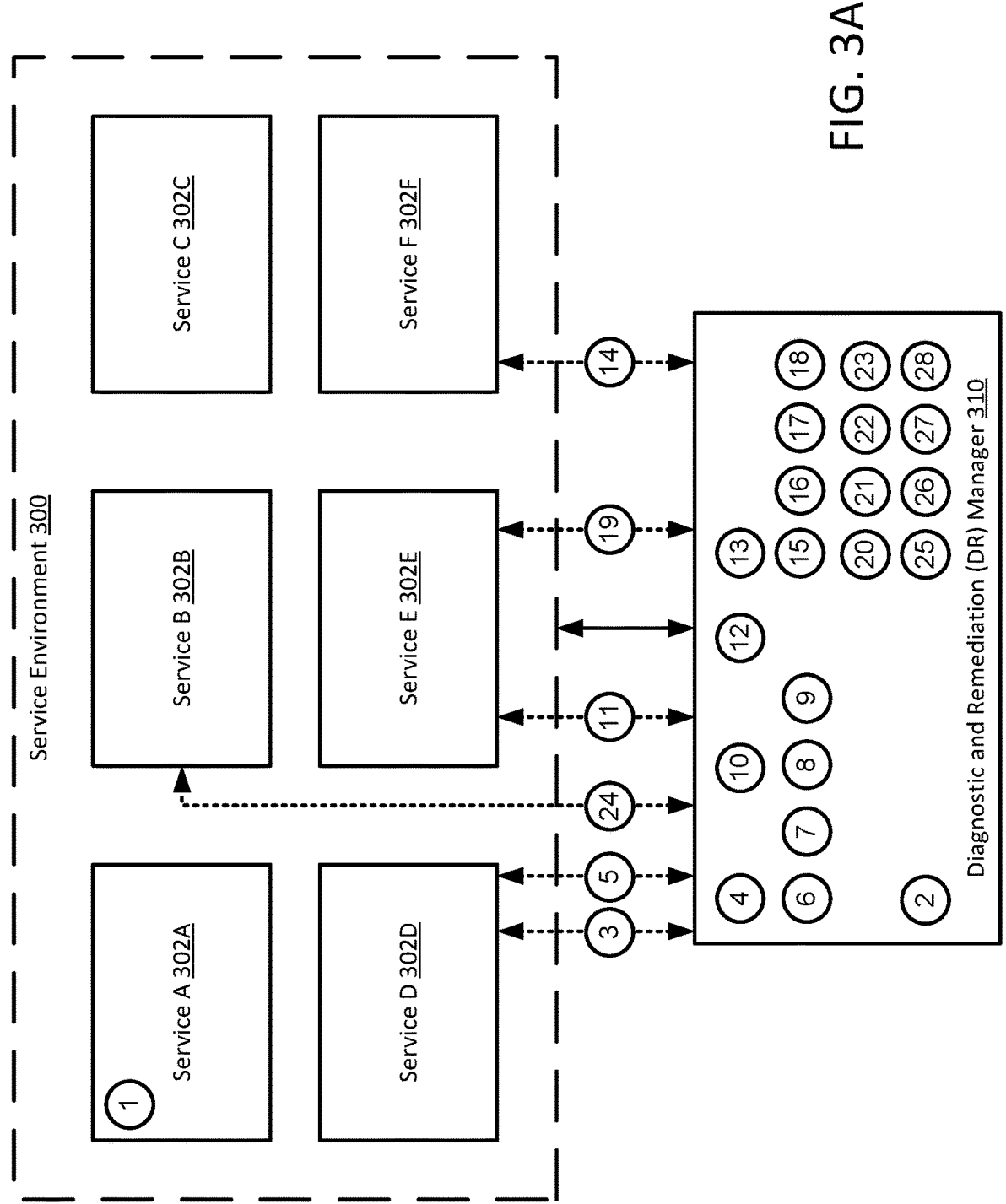
FIG. 3A shows a diagram of the operation of an example system over time in accordance with one or more embodiments of the invention.
Figure 3C:
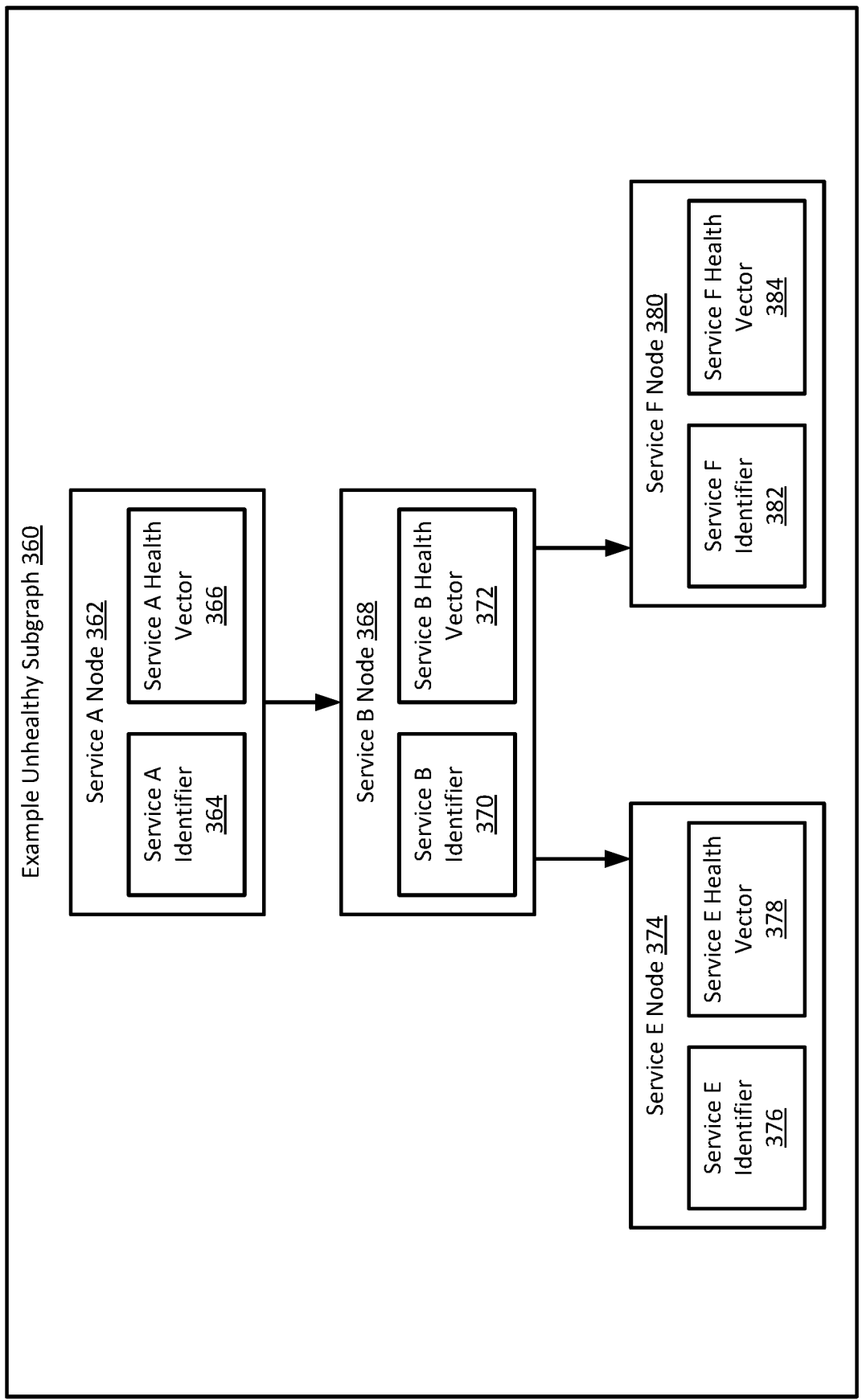

FIG. 3A shows a diagram of the operation of an example system over time in accordance with one or more embodiments of the invention. FIGS. 3B-3C show diagrams of example data structures used by the example system in accordance with one or more embodiments of the invention. The following examples are for explanatory purposes only and not intended to limit the scope of embodiments described herein. Additionally, while the examples show certain aspects of embodiments described herein, all possible aspects of such embodiments may not be illustrated in these particular examples. The examples are intended to be simple examples to illustrate, at least in part, concepts described herein.

Turning to FIG. 3A, consider a simple scenario in which a service environment (300) includes six services: service A (302A), service B (302B), service C (302C), service D (302D), service E (302E), and service F (302F). A diagnostic and remediation DR manager (310) is operatively connected to the service environment (300) and the services within (302A, 302B, 302C, 302D, 302E, 302F).

At a first point in time, at Step 1, service A (302A) fails. In response to the failure of service A (302A), at Step 2, a user of the example system notifies the DR manager (310) that service A (302A) has failed. The DR manager (310) identifies obtaining the notification as a diagnostic event associated with service A. After identifying the diagnostic event, at Step 3, the DR manager (310) requests and obtains communication information associated with the services (302A, 302B, 302C, 302D, 302E, 302F) from service D (302D). Service D (302D) is a monitoring service that monitors the performance and communications of each of the services (302A, 302B, 302C, 302D, 302E, 302F). At Step 4, the DR manager (310) generates a dependency DAG associated with service A (302A). The dependency DAG specifies: (i) service B (302B) and service C (302C) are dependent upon service A, (ii) service E (302E) is dependent upon service B (302B), and (iii) service F (302F) is dependent upon service E (302E).

At Step 5, the DR manager (310) requests and obtains performance metrics associated with the services included in the dependency DAG from service D (302D). After obtaining the performance metrics, at Step 6, the DR manager (310) generates health vectors associated with each service in the dependency DAG. For additional discussion regarding health vectors, refer to FIG. 3B. The health vectors specify that service A (302A), service B (302B), service E (302E), and service D (302D) are all unhealthy. The health vectors further specify that service C (302C) is healthy.

At Step 7, the DR manager (310) uses the health vectors to update the dependency DAG to generate an unhealthy subgraph. For additional information regarding the unhealthy subgraph, refer to FIG. 3C. The unhealthy subgraph does not include service C (302C) as it is healthy. The unhealthy subgraph therefore includes service A (302A), service B (302B), service E (302E), and service F (302F).

At Step 8, the DR manager (310) determines that a DRP included in a DRP repository is within a service distance associated with the unhealthy subgraph. The service distance is zero and the services included in the DRP are an exact match of the services included in the unhealthy subgraph (i.e., service A (302A), service B (302B), service E (302E), and service F (302F)). In response to the determination, at Step 9, the DR manager (310) makes another determination that the DRP within the service distance is also within a total health distance of zero (i.e., the health vectors included in the DRP exactly match the health vectors included in the unhealthy subgraph).

In response to the second determination, the DR manager (310) selects the DRP at Step 10. At step 11, the remediation specified by the DRP is to restart service E (302E) as initiated. Service E (302E) restarts and a configurable amount of time has passed. Service E (302E) provides updated performance metrics which indicate that service E (302E) is still unhealthy. At Step 12, the DR manager (310) determines that the remediation was not successful. At Step 13, the DR manager (310) determines that there is not another DRP within the service distance and the total health distance associated with the unhealthy subgraph. As a result, at Step 14, the DR manager (310) selects the bottommost node in the unhealthy subgraph and performs remediations specified by a remediation list on service F (302F).

At Step 15, the DR manager (310) determines that a remediation specified by the remediation was successful. In response to the determination, the DR manager (310), at Step 16, updates the unhealthy subgraph to indicate that service F (302F) is now healthy. The remediation that remediated service F (302F) had no effect on the other services in the unhealthy subgraph. As a result, at Step 17, the DR manager (310) determines that there are additional unhealthy nodes in the unhealthy subgraph. In response to the determination, at Step 18, the DR manager (310) selects the bottommost remaining unhealthy node, service E (302E).

At Step 19, the DR manager (310) performs remediations specified by a remediation list on service E (302E). At Step 20, the DR manager (310) determines that a remediation specified by the remediation was successful. In response to the determination, the DR manager (310), at Step 21, updates the unhealthy subgraph to indicate that service E (302E) is now healthy. The remediation that remediated service E (302E) had no effect on the other unhealthy services in the unhealthy subgraph. As a result, at Step 22, the DR manager (310) determines that there are additional unhealthy nodes in the unhealthy subgraph. In response to the determination, at Step 23, the DR manager (310) selects the bottommost remaining unhealthy node, service B (302B).

At step 24, the DR manager (310) performs remediations specified by a remediation list on service B (302B). At Step 25, the DR manager (310) determines that a remediation specified by the remediation was successful. In response to the determination, the DR manager (310), at Step 26, updates the unhealthy subgraph to indicate that service B (302B) is now healthy. The remediation that remediated service E (302E) remediated service A (302A). As a result, at Step 27, the DR manager (310) determines that there are no additional unhealthy nodes in the unhealthy subgraph. In response to the determination, at Step 28, the DR manager (310) generates a new DRP and stores the new DRP in the DRP repository to be used for later remediations of service failures.

FIG. 3B shows a diagram of service A example performance metrics (320). The example performance metrics (320) include the service A identifier (322) associated with service A (302A). The metrics (324) included in the performance metrics may include CPU utilization (326), access (i.e., whether service A (302A) may be accessed) (328), operations per second (330), and status (332). Each of the metrics (324) may be associated with a value vector (334) which may include the particular value of the metrics (324). The value vector (334) may specify that service A (302A) includes a CPU utilization (326) of 50% (336), the access of service A (302A) is "False" (338), the operations per second of service A (302A) is 1234 (340), and the status of service A (302A) is "Active". The value vector (334) is used to generate a health vector (344), which is denoted with the dashed box in FIG. 3B. The health vector (344) specifies that the CPU utilization (326) is below the threshold of 90% and therefore the CPU utilization dimension is set to one (346). The access is not within the subset of non-scalar values associated with access that include "True" and therefore the access dimension is set to zero (348). The operations per second (330) is above a threshold of 1000 and therefore the operations per second dimension is set to zero (350). The status (332) is within the subset of non-scalar values associated with status that include "Active" and "Standby", and therefore the status dimension is set to one (352).

FIG. 3C shows a diagram of example unhealthy subgraph discussed above in FIG. 3A. The example unhealthy subgraph includes the service A node (362), which is dependent upon by the service B node (368), which in turn is dependent upon by both the service E node (374) and the service F node (380) as indicated by the arrows in FIG. 3C. The service A node (362) includes the service A identifier (364) and the service A health vector (366) associated with service A (302A). The service B node (368) includes the service B identifier (370) and the service B health vector (372) associated with service B (302B). The service E node (374) includes the service E identifier (376) and the service E health vector (378) associated with service E (302E). The service F node (380) includes the service F identifier (382) and the service F health vector (384) associated with service F (302F).

End of Examples

Figure 4:
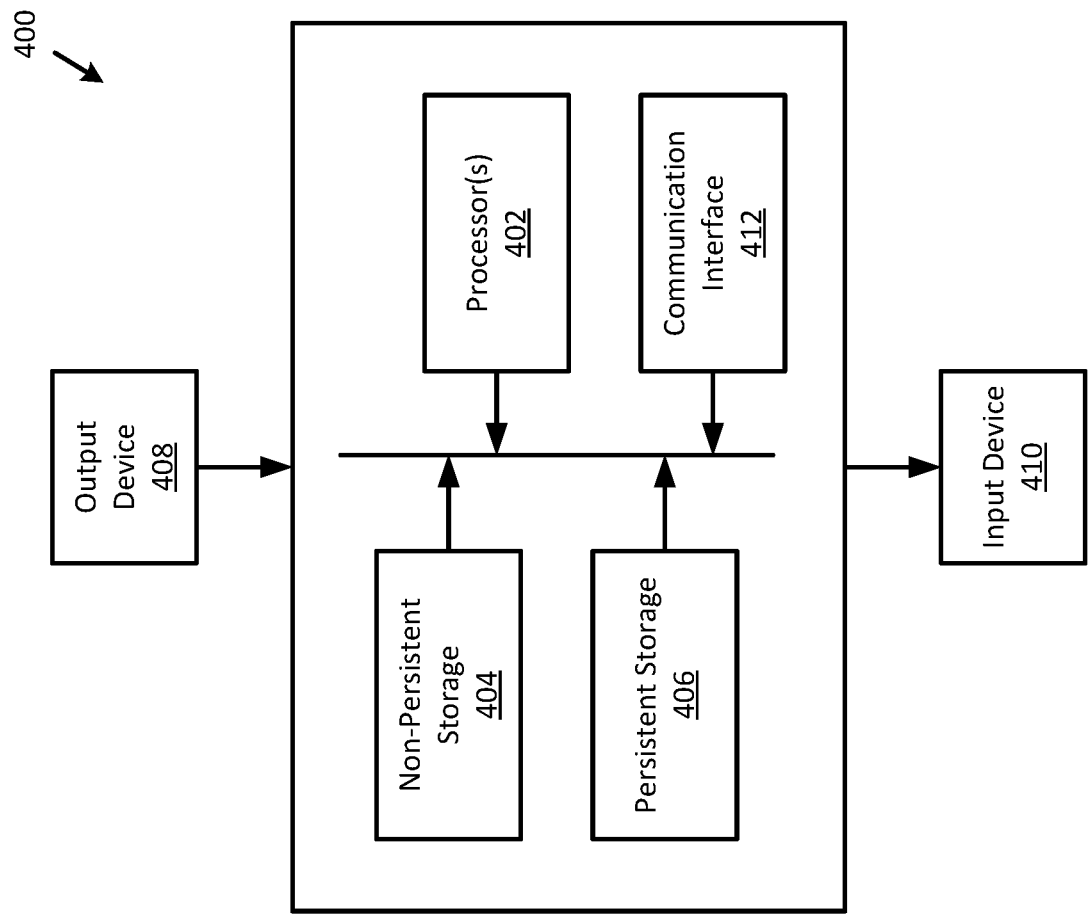
FIG. 4 shows a diagram of a computing device in accordance with one or more embodiments of the invention.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention relate to automatically diagnosing and remediating services in a service environment that includes numerous dependent services. As such, service failures may be efficiently remediated and the impact of such failures may be mitigated.

Thus, embodiments of the invention may address the problem of inefficient use of computing resources to diagnose and remediate services. This problem arises due to the technological nature of the environment in which the services are executed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for diagnosing and remediating service failures, the method comprising:
   identifying, by a diagnostic and remediation manager, a diagnostic event associated with a failed service of services, wherein:
      the services are executed in a service environment of at least one computing device;
      the execution of the services causes the at least one computing device to perform at least one computer implemented service; and
      the execution of the failed service causes the computing device to perform a portion of the computer implemented service;
   generating a dependency directed acyclic graph (DAG) associated with the failed service,
      wherein the dependency DAG specifies a hierarchical relationship of dependencies between at least a portion of the services and the failed service;

generating health vectors associated with each node of the dependency DAG using performance metrics associated with the at least a portion of the services stored in storage;

updating the dependency DAG using the health vectors to generate an unhealthy subgraph, wherein updating the dependency DAG using the health vectors to generate an unhealthy subgraph comprises:

removing a first sub-portion of the at least a portion of the services that are healthy using the health vectors from the dependency DAG; and including a second sub-portion of the at least a portion of the services that are unhealthy using the health vectors in the unhealthy subgraph; and remediating, by the diagnostic and remediation manager, the failed service based on the unhealthy subgraph using a diagnostic and remediation plan (DRP) repository stored in storage, wherein remediating the failed service based on the unhealthy subgraph comprises updating the DRP repository based on the remediating.

2. The method of claim 1, wherein the dependency DAG comprises nodes associated with the at least a portion of the services, wherein:

a first service of the at least a portion of the services is dependent upon the failed service; and the failed service is dependent upon a second service of the at least a portion of the services.

3. The method of claim 2, wherein a health vector of the health vectors specifies whether a service of the at least a portion of the services is healthy.

4. The method of claim 2, wherein the unhealthy subgraph comprises:

nodes associated with the second sub-portion of the at least a portion of the services that are unhealthy; and health vectors associated with the second sub-portion of the portion of the services.

5. The method of claim 1, wherein remediating the failed service based on the unhealthy subgraph using the DRP repository comprises:

making a first determination that the DRP repository does not include a DRP within a service distance associated with the unhealthy subgraph; and in response to the first determination:

selecting a first unhealthy node of the unhealthy subgraph;

initiating performance of a first remediation specified by a remediation list;

making a second determination that the first remediation was not successful; and in response to the second determination:

making a third determination that the remediation list comprises an additional remediation; and in response to the third determination:

initiating performance of a second remediation specified by the remediation list;

making a fourth determination that the remediation was successful; and in response to the fourth determination:

updating the unhealthy subgraph based on the remediation;

making a fifth determination that there are no additional unhealthy nodes in the unhealthy subgraph; and in response to the fifth determination;

generating a new DRP based on the unhealthy subgraph and the second remediation; and storing the new DRP in the DRP repository.

6. The method of claim 5, wherein the first unhealthy node is a leaf node of the unhealthy subgraph.

7. The method of claim 1, wherein remediating the failed service based on the unhealthy subgraph using the DRP repository comprises:

making a first determination that the DRP repository includes a DRP within a service distance associated with the unhealthy subgraph; and in response to the first determination:

making a second determination that the DRP in not within a total health distance (THD) associated with the unhealthy subgraph; and in response to the second determination:

selecting a first unhealthy node of the unhealthy subgraph;

initiating performance of a first remediation specified by a first remediation list;

making a third determination that the first remediation was successful; and in response to the third determination:

updating the unhealthy subgraph based on the first remediation;

making a fourth determination that the unhealthy subgraph comprises additional unhealthy nodes; and in response to the fourth determination:

selecting a second unhealthy node of the unhealthy subgraph;

initiating performance of a second remediation specified by a second remediation list;

making a fifth determination that the first remediation was successful; and in response to the third determination:

updating the unhealthy subgraph based on the second remediation;

making a sixth determination that there are no additional unhealthy nodes in the unhealthy subgraph; and in response to the sixth determination;

generating a new DRP based on the unhealthy subgraph, the first remediation, and the second remediation; and storing the new DRP in the DRP repository.

8. The method of claim 1, wherein remediating the failed service based on the unhealthy subgraph using the DRP repository comprises:

making a first determination that the DRP repository includes DRPs within a service distance associated with the unhealthy subgraph; and in response to the first determination:

making a second determination that a portion of the DRPs are within a total health distance (THD) associated with the unhealthy subgraph; and in response to the second determination:

selecting a first DRP of the portion of the DRPs;

initiating performance of a first remediation specified by the first DRP;

making a third determination that the remediation was not successful; and in response to the third determination:

making a fourth determination that additional DRPs are included in the portion of the DRPs; and in response to the fourth determination:
  selecting a second DRP of the portion of the DRPs;
  initiating performance of a second remediation specified by the first DRP;
  making a fifth determination that the remediation was successful; and
  in response to the fifth determination:
    generating a new DRP based on the unhealthy subgraph and the second remediation; and
    storing the new DRP in the DRP repository.

9. The method of claim 8, wherein the first DRP comprises:
  a list of services included in a previous unhealthy subgraph;
  previous health vectors associated with the list of services included in the previous unhealthy subgraph;
  an auto remediation status associated with a service of the list of services included in the previous unhealthy subgraph; and
  a previous remediation used to remediate the previous unhealthy subgraph.

10. The method of claim 9, wherein the service distance specifies a maximum quantity of different services between the list of services included in the previous unhealthy subgraph and the second sub-portion of the at least a portion of the services included in the unhealthy subgraph.

11. The method of claim 9, wherein the THD specifies a maximum quantity of differences between the previous health vectors and the health vectors.

12. A system for diagnosing and remediating service failures, comprising:
  a service environment of at least one computing device comprising services; and
  a diagnostic and remediation (DR) manager, comprising a processor and memory, programmed to:
    identify a diagnostic event associated with a failed service of services, wherein:
      execution of the services causes the at least one computing device to perform at least one computer implemented service; and
      execution of the failed service causes the computing device to perform a portion of the computer implemented service;
    generate a dependency directed acyclic graph (DAG) associated with the failed service, wherein the dependency DAG specifies a hierarchical relationship of dependencies between at least a portion of the services and the failed service;
    generate health vectors associated with each node of the dependency DAG using performance metrics associated with the at least a portion of the services stored in storage;
    update the dependency DAG using the health vectors to generate an unhealthy subgraph, wherein updating the dependency DAG using the health vectors to generate an unhealthy subgraph comprises:
      removing a first sub-portion of the at least a portion of the services that are healthy using the health vectors from the dependency DAG; and
      including a second sub-portion of the at least a portion of the services that are unhealthy using the health vectors in the unhealthy subgraph; and
    remediating, by the diagnostic and remediation manager, the failed service based on the unhealthy subgraph using a diagnostic and remediation plan (DRP) repository stored in storage, wherein remediating the failed service based on the unhealthy subgraph comprises updating the DRP repository based on the remediating.

13. The system of claim 12, wherein the dependency DAG comprises nodes associated with the at least a portion of the services, wherein:
  a first service of the at least a portion of the services is dependent upon the failed service; and
  the failed service is dependent upon a second service of the at least a portion of the services.

14. The system of claim 13, wherein a health vector of the health vectors specifies whether a service of the at least a portion of the services is healthy.

15. The system of claim 13, wherein the unhealthy subgraph comprises:
  nodes associated with the second sub-portion of the at least a portion of the services that are unhealthy; and
  health vectors associated with the second sub-portion of the portion of the services.

16. A non-transitory computer readable medium comprising computer readable program code, which when executed by a computer processor enables the computer processor to perform a method for diagnosing and remediating service failures, the method comprising:
  identifying, by a diagnostic and remediation manager, a diagnostic event associated with a failed service of services, wherein:
    the services are executed in a service environment of at least one computing device;
    the execution of the services causes the at least one computing device to perform at least one computer implemented service; and
    the execution of the failed service causes the computing device to perform a portion of the computer implemented service;
  generating a dependency directed acyclic graph (DAG) associated with the failed service,
    wherein the dependency DAG specifies a hierarchical relationship of dependencies between at least a portion of the services and the failed service;
  generating health vectors associated with each node of the dependency DAG using performance metrics associated with the at least a portion of the services stored in storage;
  updating the dependency DAG using the health vectors to generate an unhealthy subgraph,
    wherein updating the dependency DAG using the health vectors to generate an unhealthy subgraph comprises:
      removing a first sub-portion of the at least a portion of the services that are healthy using the health vectors from the dependency DAG; and
      including a second sub-portion of the at least a portion of the services that are unhealthy using the health vectors in the unhealthy subgraph; and
  remediating, by the diagnostic and remediation manager, the failed service based on the unhealthy subgraph using a diagnostic and remediation plan (DRP) repository stored in storage, wherein remediating the failed service based on the unhealthy subgraph comprises updating the DRP repository based on the remediating.

17. The non-transitory computer readable medium of claim 16, wherein the dependency DAG comprises nodes associated with the at least a portion of the services, wherein:

a first service of the at least a portion of the services is dependent upon the failed service; and the failed service is dependent upon a second service of the at least a portion of the services.

18. The non-transitory computer readable medium of claim 17, wherein a health vector of the health vectors specifies whether a service of the at least a portion of the services is healthy.

19. The non-transitory computer readable medium of claim 17, wherein the unhealthy subgraph comprises:
   nodes associated with the second sub-portion of the at least a portion of the services that are unhealthy; and
   health vectors associated with the second sub-portion of the portion of the services.

20. The non-transitory computer readable medium of claim 16, wherein remediating the failed service based on the unhealthy subgraph using the DRP repository comprises:
   making a first determination that the DRP repository does not include a DRP within a service distance associated with the unhealthy subgraph; and
   in response to the first determination:
      selecting a first unhealthy node of the unhealthy subgraph;
      initiating performance of a first remediation specified by a remediation list;
      making a second determination that the first remediation was not successful; and
      in response to the second determination:
         making a third determination that the remediation list comprises an additional remediation; and
         in response to the third determination:
            initiating performance of a second remediation specified by the remediation list;
            making a fourth determination that the remediation was successful; and
            in response to the fourth determination:
               updating the unhealthy subgraph based on the remediation;
               making a fifth determination that there are no additional unhealthy nodes in the unhealthy subgraph; and
               in response to the fifth determination;
               generating a new DRP based on the unhealthy subgraph and the second remediation; and
               storing the new DRP in the DRP repository.

* * * * *